United States Patent
Sakata et al.

(10) Patent No.: US 6,521,376 B1
(45) Date of Patent: Feb. 18, 2003

(54) NON-AQUEOUS LIQUID ELECTROLYTE CELL

(75) Inventors: Tadashi Sakata, Ibaraki (JP); Yoshifumi Sakamoto, Ibaraki (JP); Masanori Sugano, Ibaraki (JP); Akira Asada, Ibaraki (JP); Keiji Nakamura, Ibaraki (JP); Megumu Takai, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 140 days.

(21) Appl. No.: 09/718,406

(22) Filed: Nov. 24, 2000

(30) Foreign Application Priority Data

Nov. 26, 1999 (JP) ............................................ 11-335286

(51) Int. Cl.⁷ ................................................ H01M 4/58
(52) U.S. Cl. ................................ 429/218.1; 429/231.1; 429/122
(58) Field of Search ........................... 429/231.1, 218.1, 429/224, 231.95, 188, 122, 324

(56) References Cited

U.S. PATENT DOCUMENTS 5,976,731 A  * 11/1999  Negoro et al. ............... 429/328
6,162,264 A  * 12/2000  Miyazaki et al. .......... 29/623.5

FOREIGN PATENT DOCUMENTS

| JP | A6023954 | 2/1985 |
| JP | A5283074 | 10/1993 |
| JP | A7272714 | 10/1995 |
| JP | A8227708 | 9/1996 |

* cited by examiner

*Primary Examiner*—Stephen Kalafut
*Assistant Examiner*—R Alejandro
(74) *Attorney, Agent, or Firm*—Birch, Stewart, Kolasch & Birch, LLP

(57) ABSTRACT

A non-aqueous liquid electrolyte cell comprising a positive electrode which has a metal oxide as an active material, a negative electrode, and a non-aqueous liquid electrolyte, in which the metal oxide has an average particle size of 40 to 150 $\mu$m, and the volume of the liquid electrolyte is 0.9 to 1.25 times as large as the volume of the metal oxide, which has good characteristics even at low temperature.

5 Claims, 1 Drawing Sheet

(Fig. 1)
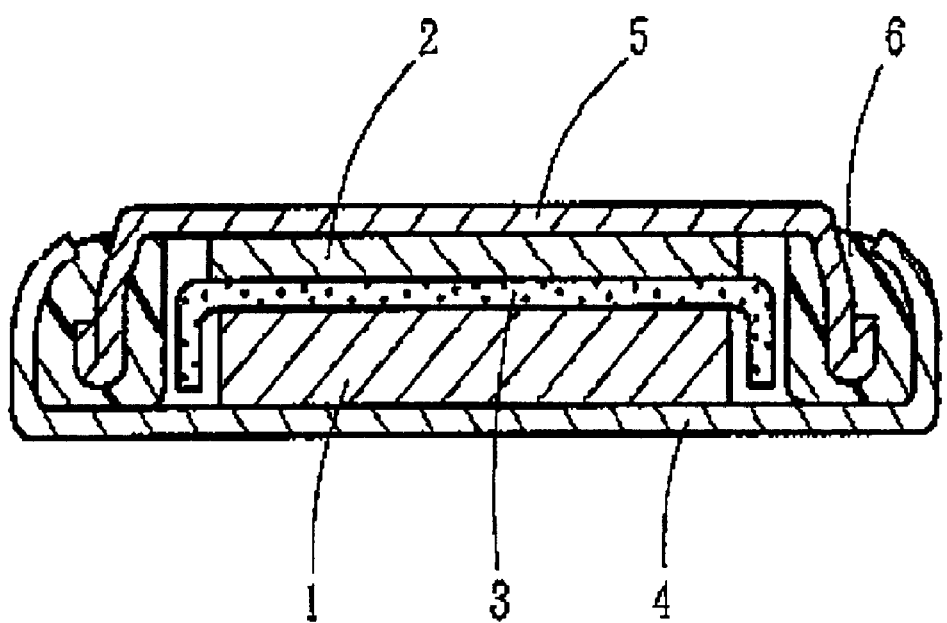

NON-AQUEOUS LIQUID ELECTROLYTE CELL

BACKGROUND OF THE INVENTION

1. Field of the Invention

The present invention relates to a non-aqueous liquid electrolyte cell which uses a metal oxide as an active material of a positive electrode.

2. Prior Art

Non-aqueous liquid electrolyte cells are widely used as power sources of electric clocks or watches or memory backup power sources, since they can be used in a wide temperature range and have long-term reliability. However, the non-aqueous liquid electrolytes have a low ion conductivity of about one fortieth of that of aqueous electrolytes, since they comprise organic solvents as the solvents of liquid electrolytes. Therefore, the non-aqueous liquid electrolyte cells are designed so that the amount of the liquid electrolyte in the cells is larger than that in alkaline cells comprising an alkaline solution as a liquid electrolyte, since the discharge capacity of the former cell decreases when the amount of the liquid electrolyte in the non-aqueous liquid electrolyte cells is the same as that in the alkaline cells. In general, the conventional non-aqueous liquid electrolyte cells contain about 1.4 times volume of the liquid electrolyte in relation to the volume of a metal oxide as the active material of the positive electrode.

To increase the capacity of the cells, it is desired to increase the charging amount of active material as much as possible in addition to the increase of the conductivity of electrodes. However, the amounts of the active material can be increased in the limit of the volume of the cell, since the cell size is fixed. Therefore, it is necessary to effectively utilize the internal volume of the cell.

Thus, it may be contemplated to increase the amounts of the active material by the decrease of the volumes occupied by constituent elements other than the active materials. For example, it is proposed to use a separator made of a thin microporous film having a uniform thickness or to decrease the wall thickness of a cell can (JP-A-60-23954, etc.) However, a sufficiently high capacity has not been achieved. In particular, the reduction of the thickness of exterior parts such as the cell can is reaching its limit from the viewpoint of the liquid leakage.

It is proposed to decrease the content of constituent components (e.g. conducting aids, binders, etc.) of the positive electrode other than the active material to increase the content of the active material in the positive electrode (JP-A-7-272714, etc.) However, it is a matter of degree, and this approach cannot present fundamental solutions.

As an alternative method to decrease the volumes of cell elements, it is contemplated to decrease the amount of the non-aqueous liquid electrolyte which is charged in the cell in a relatively large amount. However, when the amount of the liquid electrolyte is decreased, a designed voltage can be achieved in the initial discharge period, but the amount of the liquid electrolyte becomes insufficient in the separator or on the surface of the active material of the positive electrode in the course of discharging for the following reasons, and thus the liquid connection between the positive electrode and the negative electrode is interrupted so that the designed discharge capacity is not achieved.

That is, when the cell is discharged, alkaline metal ions move from the active material of the negative electrode to the positive electrode and are intercalated in the metal oxide as the active material of the positive electrode. Therefore, the active material of the positive electrode expands to induce the increase of the surface area or the increase of the volume of vacancies in the positive electrode. To allow the discharge reaction of the active material to proceed smoothly, the liquid electrolyte should be present on the surface of the active material in an amount corresponding to the surface area of the active material. However, the cell containing the limited amount of the liquid electrolyte cannot cope with the above increase of the surface area of the active material. Furthermore, the amount of the liquid electrolyte maintained in the separator becomes insufficient, since the increase of the volume of the vacancies in the positive electrode causes the shift of the liquid electrolyte from the separator to the positive electrode. Accordingly, when the amount of the liquid electrolyte is decreased and the higher amount of the active material is charged in the cell, the amount of the liquid electrolyte becomes insufficient in the last period of discharge so that the active material cannot be utilized, and thus the discharge capacity decreases.

In particular, the above decrease of the discharge capacity is significant in the case of discharging at low temperature. To increase the discharging characteristics of the cells at low temperature, usually, positive electrode active materials having a smaller particle size than conventional one (about 15 to 30 $\mu$m) are used. However, such active materials have a large surface area, and therefore cannot solve the above problems but they may deteriorate the characteristics.

SUMMARY OF THE INVENTION

One object of the present invention is to provide a non-aqueous liquid electrolyte cell having a high capacity and good characteristics even at low temperature.

Accordingly, the present invention provides a non-aqueous liquid electrolyte cell comprising a positive electrode which comprises a metal oxide as an active material, a negative electrode, and a non-aqueous liquid electrolyte, wherein said metal oxide has an average particle size of 40 to 150 $\mu$m. and the volume of said liquid electrolyte is 0.9 to 1.25 times as large as the volume of said metal oxide.

BRIEF DESCRIPTION OF THE DRAWING

FIG. 1 is a cross sectional view of one example of the non-aqueous liquid electrolyte cell according to the present invention.

DETAILED DESCRIPTION OF THE INVENTION

In the present invention, the amount of the liquid electrolyte is decreased, while the amount of the metal oxide as the active material of the positive electrode is increased in proportion to the decreased amount of the electrolyte. Since the metal oxide has an average particle size of at least 40 $\mu$m, the amount of the liquid electrolyte can be decreased to 1.25 times or less as large as the volume of the active material (metal oxide) of the positive electrode. Accordingly, the cell can be designed to have the increased capacity, in which the amount of the active material charged is increased by at least 10%. Furthermore, when the average particle size of the metal oxide is at least 50 $\mu$m, the effects of the present invention can be clearly achieved.

When the average size of the positive electrode active material is 150 $\mu$m or less, the filling density of the active material can be increased in the course of the production of the positive electrode. In addition, the value of the vacancies in the positive electrode is in an adequate range so that the ratio of the amount of the liquid electrolyte maintained in the separator to that contained in the positive electrode can be adequately adjusted. The average particle size of the positive electrode active material is preferably 100 µm or less, more preferably 70 µm or less.

In the present invention, the positive electrode active material having the above average particle size is used and thus the surface area of the active material decreases. Therefore, the discharge reaction can proceed even when the amount of the liquid electrolyte is 1.25 times or less as large as the volume of the positive electrode active material and furthermore, the catalytic activity of the active material is suppressed so that the loss of the liquid electrolyte due to decomposition may be prevented. Since the amount of the liquid electrolyte is reduced, an additional effect, that is, the prevention of the liquid leakage may be achieved.

From the viewpoint of the increase of the capacity, it is preferable to design the cell so that the above volume ratio (the ratio of the volume of the liquid electrolyte to that of the positive electrode active material) is as small as possible. Preferably, this volume ratio is 1.2 or less, more preferably 1.15 or less. On the other hand, if the minimum amount of the liquid electrolyte necessary for the discharge reaction of the positive electrode active material is taken into account, this volume ratio is preferably at least 0.9, more preferably at least 1 from the view point of the polarization during discharging.

Herein, the average particle size of the metal oxide may be measured with a microtrack particle size analyzer, or by observing the specific number of particles, for example, about 100 particles with a scanning electron microscope, measuring the particle size of each particle and then averaging the measured particle sizes.

Examples of the metal oxide used as the positive electrode active material in the present invention include oxides of manganese, cobalt, nickel, magnesium, copper, iron, vanadium, etc. and their complex oxides. In the typical case of manganese dioxide, either electrolysis manganese dioxide or chemically synthesized manganese dioxide can be used, and it is pulverized and sieved so that the above averaged particle size is attained.

The positive electrode may be produced by mixing the metal oxide as the positive electrode active material optionally with at least one conducting aid such as carbon black, graphite, etc. and at least one binder to obtain a positive electrode mixture and press molding the mixture or forming the mixture in the form of a sheet. In this case, a collector such as an expanded metal, a perforated metal or a metal foil may be provide inside or at the end of the positive electrode.

Herein, as the binder, polytetrafluoroethylene (PTFE), polyvinylidene fluoride (PVdF), tetrafluoroethylene-hexafluoropropylene copolymers, etc. maybe used. When the active material having the large particle size is used, the strength of the molded article of the positive electrode mixture maybe reduced, or the adhesion force of the positive electrode to the collector may be decreased. Thus, the molded article may be deformed or chipped, or the electrode mixture may be peeled off from the collector. Therefore, the binder which can avoid such problems is preferably selected. Furthermore, since the operation voltage during discharging greatly varies with the kind of the binder in the case of the cell containing the limited amount of the liquid electrolyte, it is preferable to select the binder which can achieve the operation voltage as high as possible.

From the above viewpoint, the tetrafluoroethylene-hexafluoropropylene copolymer and cellulose are particularly preferably used. When the tetrafluoroethylene-hexafluoropropylene copolymer and cellulose are both contained in the positive electrode mixture, the moldability of the mixture and the strength of the molded article of the mixture are improved, so that the production of the inferior products can be prevented in the course of the production of the positive electrodes. In addition, the polarization of the positive electrode is suppressed, and thus the cells can be produced, which exhibit good discharging characteristics at low temperature.

The tetrafluoroethylene-hexafluoropropylene copolymers include the copolymer of tetrafluoroethylene and hexafluoropropylene (FEP), and also tetrafluoroethylene-hexafluoropropylene copolymers a part of the monomeric units of which are replaced with other monomer units such as vinylidene fluoride, etc.

Examples of the cellulose include molecular cellulose such as hydroxypropylcellulose (HPC), hydroxyethylcellulose (HEC), hydroxymethylethylcellulose (HMEC), hydroxypropylmethylcellulose (HPMC), methylcellulose (MC), etc., and ionic cellulose such as carboxymethylcellulose (CMC), carboxymethylethylcellulose (CMEC), etc.

When FEP is used as the binder, it is preferably heated to a temperature around its melting point (about 270° C.) to melt and diffuse it in the mixture and to increase the strength of the molded article.

In the above heating process, the cellulose polymers are decomposed since they have relatively low decomposition temperature. In the case of the ionic cellulose such as CMC, it is used in the form of a sodium or ammonium salt, and thus ionic compounds such as sodium compounds, etc. may be formed in the heating process although the amount is very small. If decomposed products such as the ionic compounds are present in the positive electrode, the characteristics of the cells such as the capacity may sometimes deteriorate when the cells are stored at high temperature. On the other hand, when the molecular cellulose is used, such decomposed products which may deteriorate the characteristics may not be formed, and thus the cells with good storage properties can be obtained.

Among the cellulose polymers, HPC is preferably used, since it can increase the viscosity of the mixture with a small amount and has a high effect to increase the strength of the molded article of the positive electrode mixture prior to heating.

In general, metal lithium or lithium compounds are used as the active materials of the negative electrode which faces the positive electrode. The lithium compounds include lithium alloys and other compounds. Examples of the lithium alloys are lithium-aluminum, lithium-lead, lithium-indium, lithium-gallium, lithium-indium-gallium, etc. Examples of the lithium compounds other than the lithium alloys are tin oxide, silicon oxide, nickel-silicon alloy, magnesium-silicon alloy, carbonaceous materials having random layer structures, graphite, tungsten oxide, lithium-titanium complex oxide, lithium-containing complex nitride, etc. Some of the exemplified compounds do not contain lithium, but they are changed to compounds having lithium when they function as the active materials of the negative electrode.

Among the above negative electrode active materials, metal lithium and the lithium alloys are preferable since they achieve the high capacity.

The liquid electrolyte may be any non-aqueous liquid electrolyte that has the lithium ion conductivity. The non-aqueous liquid electrolyte may be prepared by dissolving at least one electrolyte in an organic solvent or an organic mixed solvent.

Examples of the electrolyte include $LiClO_4$, $LiPF_6$, $LiBF_4$, $LiB(C_6H_5)_4$, $LiAsF_6$, $LiSbF_6$, $LiCF_3SO_3$, $LiC_4F_9SO_3$, $LiCF_3CO_2$, $Li_2F_4(SO_3)_2$, $LiN(CF_3SO_2)_2$, $LiC(CF_3SO_2)_3$, $LiC_nF_{2n+1}SO_3$ ($n \geq 2$), etc. They may be used independently or in admixture of two or more.

Examples of the organic solvent include 1,2-dimethoxyethane, 1,2-diethoxyethane, dimethyl carbonate, diethyl carbonate, ethylmethyl carbonate, ethylene carbonate, propylene carbonate, butylene carbonate, γ-butyrolactone, ethyl acetate, methyl propionate, tetrahydrofuran, 2-methyltetrahydrofuran, dimethyl ether, diethyl ether, 1,3-dioxolane, 4-methyl-1,3-dioxolane, ethyleneglycol sulfite, etc. They may be used independently or in admixture of two or more.

The concentration of the electrolyte in the liquid electrolyte is not limited and is preferably from 0.2 to 1.7 mol/l, more preferably from 0.4 to 1.5 mol/l.

The non-aqueous liquid electrolyte cell of the present invention may be produced by any conventional production method. For example, the positive electrode and the negative electrode are faced each other with inserting a separator between them, and stored in a cell can, and then the specific amount of the liquid electrolyte is poured in the cell can.

The type of the cell is not limited, and the present invention may be applied to a primary or secondary cell in the form of a coin, a sheet, a cylinder, a square pillar, etc.

EXAMPLES

The present invention will be illustrate by the following Examples, which do not limit the scope of the invention in any way.

In the Examples, "aparts" are "parts by weight".

Example 1

Electrolysis manganese dioxide having an average particle size of 55 μm (93 parts), graphite (6 parts) as a conducting aid and PTFE (1 part) as a binder were mixed to prepare a positive electrode mixture, and this mixture was press molded to obtain a positive electrode. In this process, some positive electrodes deformed. Thus, the positive electrodes which had no problem in use were selected and used in the following step to assemble cells.

A metal lithium sheet was used as a negative electrode and a non-woven fabric of polypropylene was used as a separator.

As a non-aqueous liquid electrolyte, a 0.5 mol/l solution of $LiClO_4$ in the mixed solvent of propylene carbonate and dimethyl ether (1:1 by volume) was used. The volume of the liquid electrolyte was 1.2 times as large as the volume of manganese dioxide as the positive electrode active material.

Using the positive electrode, the negative electrode, the separator and the non-aqueous liquid electrolyte, a coin-type non-aqueous liquid electrolyte cell shown in FIG. 1 having a diameter of 20 mm and a thickness of 3.2 mm was assembled.

Now, the non-aqueous liquid electrolyte cell of FIG. 1 is explained.

The positive electrode 1 consists of the press molded article of the positive electrode mixture comprising electrolysis manganese dioxide having an average particle size of 55 μm, while the negative electrode 2 consists of metal lithium. The separator 3 made of the polypropylene nonwoven fabric is inserted between the positive electrode 1 and the negative electrode 2.

The positive electrode 1, the negative electrode 2, the separator 3, and the liquid electrolyte are contained in the space formed by the positive electrode can 4 made of stainless steel, the negative electrode can 5 made of stainless steel, and the annular gasket 6 made of polypropylene. The opening edge of the positive electrode can 5 is clamped inwardly so that the annular gasket 6, which is positioned on the peripheral edge of the negative electrode can 5, is pressed against the inner peripheral face of the opening edge of the positive electrode can 4 and the outer peripheral face of the edge of the negative electrode 5.

Example 2

A non-aqueous liquid electrolyte cell was produced in the same manner as in Example 1 except that manganese dioxide having an average particle size of 80 μm was used.

Example 3

A non-aqueous liquid electrolyte cell was produced in the same manner as in Example 1 except that manganese dioxide having an average particle size of 150 μm was used.

Example 4

A non-aqueous liquid electrolyte cell was produced in the same manner as in Example 1 except that the volume ratio of the liquid electrolyte to manganese dioxide was changed to 1.1:1.

Example 5

A non-aqueous liquid electrolyte cell was produced in the same manner as in Example 1 except that manganese dioxide having an average particle size of 40 μm was used, and the volume ratio of the liquid electrolyte to manganese dioxide was changed to 1:1.

Example 6

Electrolysis manganese dioxide having an average particle size of 55 μm (91 parts), graphite (4.5 parts), a tetrafluoroethylene-hexafluoropropylene copolymer (FEP) (4 parts) and HPC (0.5 part) were mixed to prepare a positive electrode mixture, and this mixture was press molded and heated at 300° C. for 2 hours to obtain a positive electrode. The obtained positive electrode had better strength than those of Examples 1 to 5, and has no defects such as deformation or chipping.

Then, a non-aqueous liquid electrolyte cell was produced in the same manner as in Example 4 except that the above produced positive electrode was used and a non-aqueous liquid electrolyte comprising a 0.5 mol/l solution of $LiClO_4$ dissolved in the mixed solvent of propylene carbonate and 1,2-dimethoxyethane (1:1 by volume) was used.

Example 7

A non-aqueous liquid electrolyte cell was produced in the same manner as in Example 6 except that CMC in the form of a sodium salt was used in place of HPC.

Comparative Example 1

A non-aqueous liquid electrolyte cell was produced in the same manner as in Example 1 except that manganese dioxide having an average particle size of 30 μm was used, the weight of the positive electrode was decreased by about 10% in comparison with that of Example 1, and the volume ratio of the liquid electrolyte to manganese dioxide was changed to 1.4:1.

Comparative Example 2

A non-aqueous liquid electrolyte cell was produced in the same manner as in Example 4 except that manganese dioxide having an average particle size of 30 μm was used.

Comparative Example 3

A non-aqueous liquid electrolyte cell was produced in the same manner as in Example 1 except that manganese dioxide having an average particle size of 55 μm was used and the volume ratio of the liquid electrolyte to manganese dioxide was changed to 0.8:1.

Comparative Example 4

A non-aqueous liquid electrolyte cell was produced in the same manner as in Example 1 except that manganese dioxide having an average particle size of 180 μm was used.

Measurements of Properties

A resistor of 15 kΩ was connected with the cell produced in Examples 1 to 7 and Comparative Examples 1 to 4, and the cell was discharged at 20° C. to the final voltage of 2.0 V to measure a discharge capacity. The results are shown in Table 1 together with the average particle sizes of manganese dioxide, the volume ratio of the liquid electrolyte to manganese dioxide, and the kind of the binder(s) in the positive electrodes.

TABLE 1

| Ex. No. | Av. particle size of $MnO_2$ (μm) | Volume ratio of electrolyte to $MnO_2$ | Binder in positive electrode | Discharge capacity (mAh) |
|---|---|---|---|---|
| 1 | 55 | 1.2 | PTFE | 234 |
| 2 | 80 | 1.2 | PTFE | 231 |
| 3 | 150 | 1.2 | PTFE | 221 |
| 4 | 55 | 1.1 | PTFE | 231 |
| 5 | 40 | 1.0 | PTFE | 224 |
| 6 | 55 | 1.1 | FEP + HPC | 240 |
| 7 | 55 | 1.1 | FEP + CMC | 239 |
| C. 1 | 30 | 1.4 | PTFE | 211 |
| C. 2 | 30 | 1.1 | PTFE | 203 |
| C. 3 | 55 | 0.8 | PTFE | 192 |
| C. 4 | 180 | 1.2 | PTFE | 198 |

With the cells of Examples 4, 6 and 7, an operation voltage was measured at −10° C. as follows:

As in the above measurement of the discharge capacity, a discharge resistor of 15 kΩ was connected with the cell, and the cell was discharged at 20° C. When the cell was discharged in the capacity corresponding to 80% of the above-measured discharge capacity, the discharge resistor was disconnected, and the cell in which the depth of discharge reached 80% was prepared. Then, this cell was placed at an atmosphere of −10° C. After the cell temperature was well decreased, a discharge resistor of 500 Ω was connected with the cell, and the cell was discharged. After 5 seconds from the start of the discharge, the operation voltage was measured to evaluate the discharging characteristics at low temperature. The results are shown in Table 2.

TABLE 2

| | Operation voltage at −10° C. of cell having depth of discharge of 80% |
|---|---|
| Example 4 | 2.271 |
| Example 6 | 2.609 |
| Example 7 | 2.597 |

Furthermore, with the cells of Examples 6 and 7, the storage property at high temperature was evaluated as follows:

The cells were stored at 80° C. for 25 days, and then cooled to 20° C. A resistor of 15 kΩ was connected with each cell, and the cell was discharged to a final voltage of 2.0 V to measure the discharge capacity at 20° C. of the cell which had been stored at high temperature.

The measured discharge capacity was compared with that of the cell which had not been stored at high temperature and expressed a capacity drop rate (%).

The results are shown in Table 3

TABLE 3

| | Discharge capacity (mAh) | | Capacity |
|---|---|---|---|
| | No storage at 80° C. | Stored at 80° C. | drop rate (%) |
| Example 6 | 240 | 240 | 4 |
| Example 7 | 239 | 220 | 8 |

As can be seen from the results of Table 1, the cells of Examples 1 to 7 in which manganese dioxide having an average particle size of 40 to 150 μm was used as the positive electrode active material and the volume ratio of the liquid electrolyte to manganese dioxide was in the range between 0.9 and 1.25, had a large discharge capacity than the cells of Comparative Examples 1 to 4 in which the average particle size of manganese dioxide or the amount of the liquid electrolyte was outside the range of the present invention. Thus, the cells of the present invention could achieve the high capacity.

The cells of Examples 6 and 7 in which the positive electrode was prepared using the positive electrode mixture containing FEP and cellulose had better discharge characteristics than the cell of Example 4 which used PTFE as the binder of the positive electrode.

Furthermore, the cell of Example 6 which used HPC (molecular cellulose) had the better storage property at high temperature than that of Example 7 which used CMC (ionic cellulose).

What is claimed is:

1. A non-aqueous liquid electrolyte cell comprising a positive electrode which comprises a metal oxide as an active material, a negative electrode, and a non-aqueous liquid electrolyte, wherein said metal oxide has an average particle size of 40 to 150 μm, and the volume of said liquid electrolyte is 0.9 to 1.25 times as large as the volume of said metal oxide.

2. The non-aqueous liquid electrolyte cell according to claim 1, wherein said metal oxide is manganese oxide.

3. The non-aqueous liquid electrolyte cell according to claim 1, wherein said positive electrode is formed from a mixture containing said metal oxide, a tetrafluoroethylene-hexafluoropropylene copolymer and cellulose.

4. The non-aqueous liquid electrolyte cell according to claim 3, wherein said cellulose is a molecular cellulose.

5. The non-aqueous liquid electrolyte cell according to claim 1, wherein said negative electrode is made of metal lithium or a lithium alloy.

* * * * *